March 1, 1960  G. BONNAIRE  2,927,185
ELECTRIC WIRING DEVICES WITH SIMPLIFIED CONNECTING MEANS
Filed Nov. 20, 1956
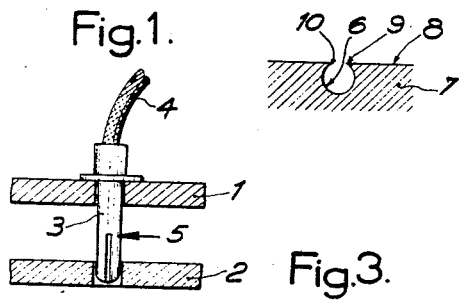
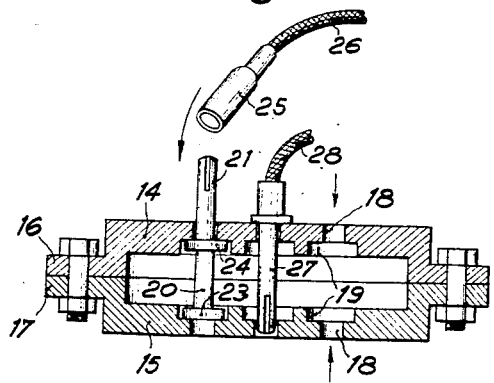
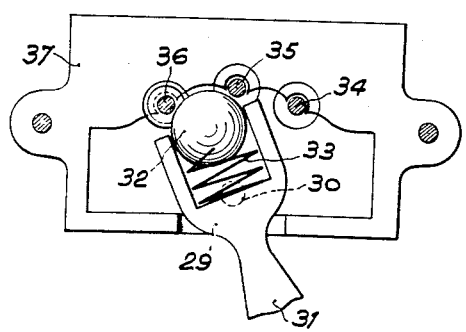

United States Patent Office 2,927,185
Patented Mar. 1, 1960

2,927,185

ELECTRIC WIRING DEVICES WITH SIMPLIFIED CONNECTING MEANS

Georges Bonnaire, Lagny, France, assignor to Société à responsabilité limitée dite: Etablissements Gelbey, Lagny, France Application November 20, 1956, Serial No. 623,496

Claims priority, application France November 23, 1955

3 Claims. (Cl. 200—166)

It is the object of this invention to provide electric wiring devices with simplified connecting means and characterized essentially in that they can be assembled very quickly without using screws, nuts or flanging, while permitting substantial savings in their manufacture and suppressing to a hitherto unknown degree any solutions of continuity in electric wiring systems.

To this end, an electric wiring device according to this invention is characterized in that it comprises at least one aperture adapted to have inserted and possibly resiliently held therein the end portion of a wire to be connected which consists for example of a contact pin, and in that it is this end portion which is utilized directly within the device, to provide the desired electric contact.

According to another feature of this invention, the aforesaid end portion is utilized in combination with a stop member, which may consist of the end portion of another wire, to resiliently hold a member ensuring an electric contact therewith.

Finally, the edges of the apertures in which the end portions of the wires are inserted may offer a certain resiliency in order to retain through an elastic action the pins inserted therein.

The invention will be better understood if reference is made to the attached drawing forming part of this specification and illustrating diagrammatically by way of example a few embodiments of the invention. In the drawing:

Figure 1 is an axial sectional view showing a first embodiment of the invention.

Figures 2 and 3 are transverse sections showing two forms of embodiment of the apertures utilized in the wiring devices of this invention.

Figure 4 is a longitudinal section showing another typical embodiment of the invention; and Figure 5 is a diagrammatical cross-sectional view showing a possible application of the invention.

Referring first to the embodiment shown in Fig. 1, the wiring device comprises a pair of walls 1, 2 in which orifices are formed which are of such suitable size and characteristics that they can receive and resiliently retain therein a contact pin 3 secured to the end of a current lead-in wire 4; the contact required with any suitable electrical member, illustrated only diagrammatically by the arrow 5, is provided by the pin 3 proper.

To resiliently retain the pin inserted in the aperture 6 formed in the wall 7, this aperture may somewhat intersect the edge 8 of the wall whereby the end portions 9, 10 of the wall of this aperture, which connect the latter to the edge 8 of the wall, will form a more or less sharp angle and may somewhat yield when a pin of a diameter slightly greater than that of the aperture 6 is inserted therein.

In the modified embodiment illustrated in Fig. 3 the aperture 11 formed in the wall 12 comprises radial slots 13 also suitable for imparting the desired resiliency of this aperture.

In the other modification illustrated in Fig. 4 of the drawing the electric wiring device comprises two parallel walls 14, 15 adapted to be assembled for example through their end portions 16, 17; each wall 14, 15 is formed with a number of apertures each having an outer portion 18 and an inner portion 19 of greater diameter than said outer portion 18.

With this arrangement, the extension 20 of a contact pin 21 formed with a pair of spaced collars 23, 24 adapted to fit in the larger or inner portions 19 of the apertures may be inserted in any one of these apertures formed in the walls 14 and 15, this extension being thus locked in position when the walls 14 and 15 are assembled together. The extension 21 projecting from the electric wiring device permits a quick connection with a female socket 25 attached to the end of a current lead-in wire 26. Furthermore, it is also possible to use with this electric wiring device male pins such as the pin 27 of Fig. 4, which is secured to the end of another lead-in wire 28 and resiliently held by the narrower outer portion 18 of one of the apertures formed in the walls 14, 15; for this purpose, these narrower outer portions 18 may be provided, to this end, with radial slots such as those illustrated in Fig. 3.

To provide a direct electric connection in a wiring device according to this invention between the contact pin thus inserted in suitable apertures of this device and another junction member, an arrangement of the type described in the French Patent No. P.V. 703,035, filed by the same applicants on November 22, 1955, for: "Electric Wiring Device With Simplified Inner Connection."

Moreover, it is also possible according to this invention to employ the switching arrangement shown in Fig. 5 which is advantageous in that it permits the use of the aforesaid contact pin either in combination with another contact pin or with a suitable stop member for maintaining in position the other part utilized for ensuring the electric connection. To this end, the switch arm 29 is pivoted on a pin 30 and comprises a control lever 31 projecting from the device to permit the actuation thereof; at its inner end this arm 29 is of fork or socket configuration and supports a ball or roller 32 of conducting material which is constantly urged to the outside by a compression spring 33; the contact pins 34, 35, 36 are resiliently held in the apertures formed to this end in the wall 37 of the device; according to the angular setting of the arm 29, the contact is ensured either between the pins 35 and 36, or between the pins 34 and 35.

Of course, it will be readily understood by anybody conversant with the art that the few typical embodiments shown and described hereinabove are given simply by way of example and should not be construed as limiting the scope of the invention as many modifications and alterations may be brought thereto without departing from the spirit and scope of the invention as set forth in the appended claims.

What I claim is:

1. An electric wiring device with simplified connecting means, which comprises a casing having a wall with at least one aperture in the wall of said casing, a support spaced inwardly from said wall and having an aperture aligned with said aperture in the wall, at least one removable contact pin comprising the terminal end of a current lead-in wire inserted in said aligned apertures and releasably held therein, said contact pin thus extending between said wall and support, a movable contact in said casing and disposed between said wall and support, means for resiliently pressing said movable contact against the portion of said removable contact pin between said wall and support and a conducting stop member secured in said casing, said contact being movable to a position in which it is resiliently urged against said contact pin and stop member to close an electric circuit between said pin and said member.

2. An electric wiring device with simplified connecting means, which comprises a casing having a wall with at least one aperture in the wall of said casing, a support spaced inwardly from said wall and having an aperture aligned with said aperture in the wall, a first removable contact pin comprising the terminal end of a current lead-in wire inserted in said aligned apertures and releasably held therein, said contact pin thus extending between said wall and support, a movable contact in said casing and disposed between said wall and support, means for resiliently pressing said movable contact against the portion of said first removable contact pin between said wall and support and a second contact pin comprising the terminal end portion of another lead-in wire, said contact being movable to a position in which it is resiliently urged against said first and second contact pins to close an electric circuit between said first and second contact pins.

3. An electric switching device comprising a casing with spaced wall portions and a plurality of pairs of aligned apertures in said wall portions, lead-in wires having terminal end portions inserted respectively in said pairs of aligned apertures and releasably held therein, said terminal end portions thus extending between said wall portions, a movable contact in said casing between said wall portions and means for moving said contact and for resiliently pressing said contact into engagement with selected ones of said terminal end portions to close an electric circuit between the lead-in wires, the respective terminal end portions of which are engaged by said movable contact.

References Cited in the file of this patent

UNITED STATES PATENTS

| | | |
|---|---|---|
| 285,670 | Phelps | Sept. 25, 1883 |
| 591,126 | Cole | Oct. 5, 1897 |
| 1,412,002 | Hendricks | Apr. 4, 1922 |
| 1,530,640 | Batchelder | Mar. 24, 1925 |
| 2,201,881 | Bryant et al. | May 21, 1940 |
| 2,668,207 | Bengtsson | Feb. 2, 1954 |

FOREIGN PATENTS

| | | |
|---|---|---|
| 107,233 | Austria | Sept. 10, 1927 |
| 354,411 | Great Britain | Jan. 26, 1931 |